No. 791,704. PATENTED JUNE 6, 1905.
C. LARDNER.
FRUIT PICKER.
APPLICATION FILED OCT. 29, 1904.
2 SHEETS—SHEET 2.
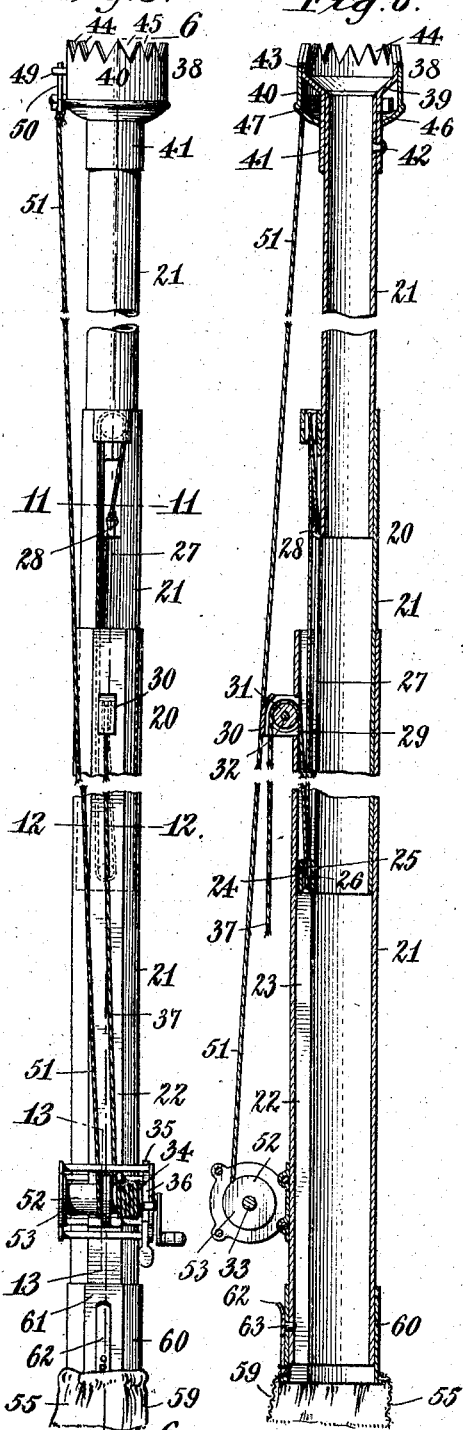
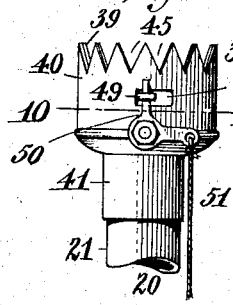
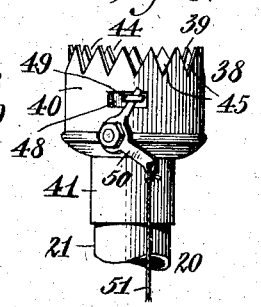
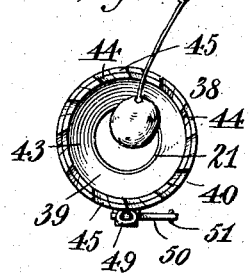
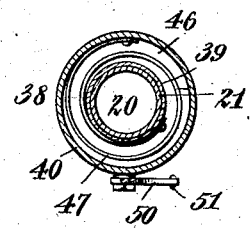
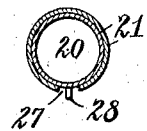
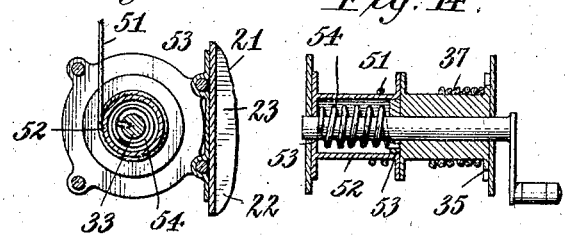
Charles Lardner, Inventor.
Julius Lankes
May Seivert } Witnesses.
By Neuhart & Burkhart,
Attorneys.

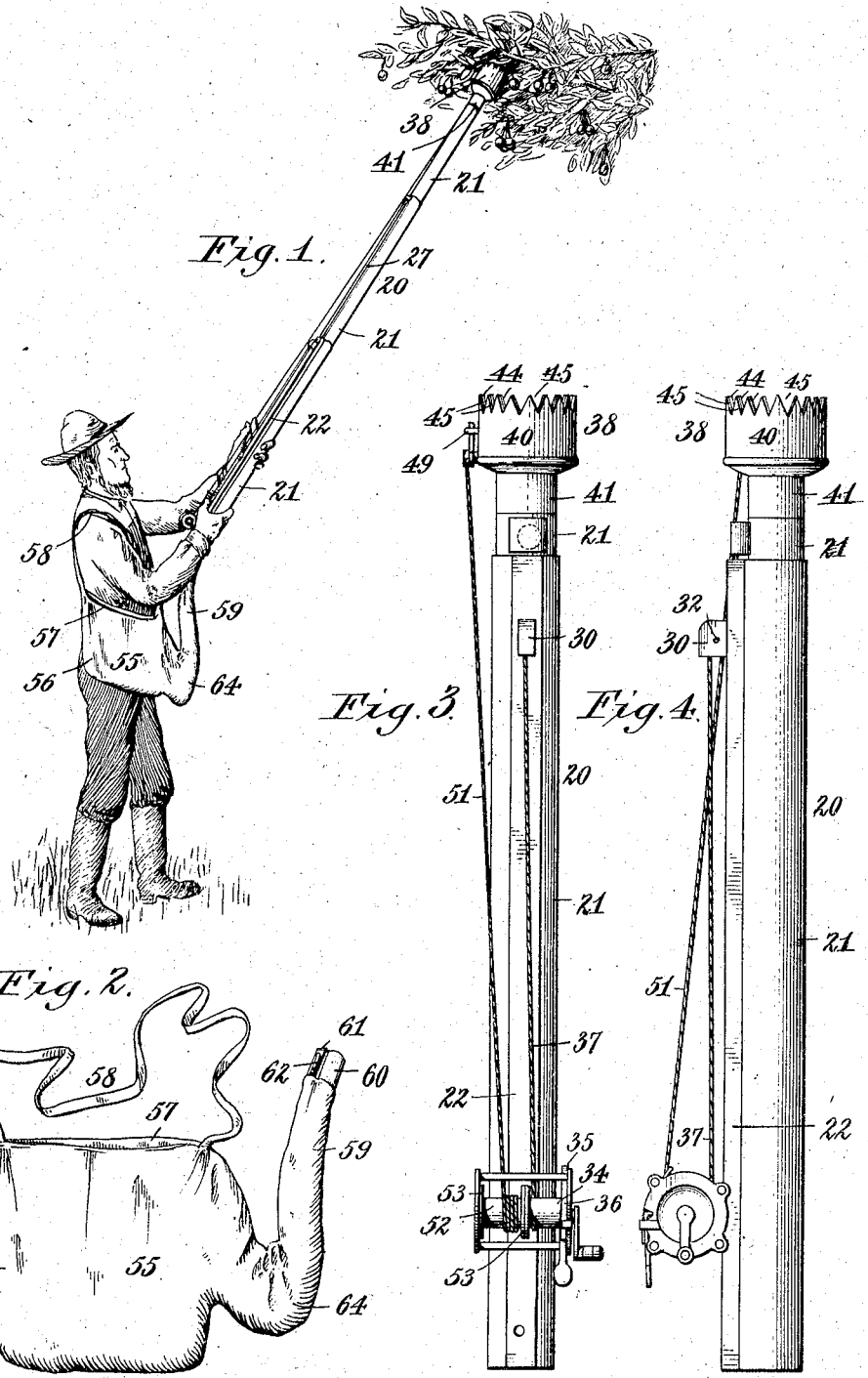

No. 791,704.

Patented June 6, 1905.

UNITED STATES PATENT OFFICE.

CHARLES LARDNER, OF BUFFALO, NEW YORK.

FRUIT-PICKER.

SPECIFICATION forming part of Letters Patent No. 791,704, dated June 6, 1905.

Application filed October 29, 1904. Serial No. 230,569.

*To all whom it may concern:*

Be it known that I, CHARLES LARDNER, a citizen of the United States, residing at Buffalo, in the county of Erie and State of New York, have invented certain new and useful Improvements in Fruit-Pickers, of which the following is a specification.

This invention relates to fruit-pickers; and its primary object is to produce an extensible fruit-picker providing means for depositing the fruit in a receptacle held to the lower end of the picker.

Other objects are to provide a picker having a staff which can be extended within reasonable limits and retain operative connection at the lower end of the staff with the cutter at the upper end of the same, whereby said cutter may be as conveniently operated when the device is extended as when collapsed; to provide an operating-cord having its upper end connected to the cutter to actuate the same and its lower end secured to a reel which is spring-controlled to hold said cord taut at all times and which serves to pay out the cord as may be needed in extending the staff; to provide a hollow staff consisting of a plurality of tubular telescopic sections and an adjusting-cord for projecting the inner section or sections and for telescoping or drawing the same in; to provide suitable means for operating the said cord, and to otherwise improve on fruit-pickers now in use, as will appear hereinafter.

The invention consists in the construction, arrangement, and combination of parts to be hereinafter described, and particularly pointed out in the appended claims.

In the drawings, Figure 1 is a perspective view of my improved fruit-picker, showing the manner in which it is used. Fig. 2 is a perspective view of the fruit bag or receptacle adapted to be attached to the lower end of the hollow telescopic staff. Fig. 3 is an enlarged plan view of the device in collapsed condition. Fig. 4 is an enlarged side elevation of the device in collapsed condition. Fig. 5 is an elevation of the device extended and broken. Fig. 6 is a longitudinal section on line 6 6, Fig. 5. Fig. 7 is a still further enlarged view of the cutter and adjacent part of the staff, showing the parts of the cutter in their normal positions. Fig. 8 is a similar view showing the cutter actuated. Fig. 9 is an end view of the cutter. Fig. 10 is a cross-section through the cutter, taken on line 10 10, Fig. 7. Fig. 11 is an enlarged cross-section of the staff, taken on line 11 11, Fig. 5. Fig. 12 is an enlarged cross-section of the staff, taken on line 12 12, Fig. 5. Fig. 13 is an enlarged longitudinal section taken on line 13 13, Fig. 5. Fig. 14 is a central longitudinal section through the operating and adjusting reels.

Referring to the drawings in detail, like numerals of reference refer to like parts in the several figures.

The reference-numeral 20 designates the tubular staff, consisting of a plurality of telescoping sections 21, herein shown as three; but two or more than three sections may be as conveniently used. In practice, however, I have ascertained that three sections will provide sufficient extension to reach to the top of ordinary fruit-trees and when collapsed will be of a convenient size for carrying and storage. The diameter of these sections may obviously vary, depending on the use it is to be put to, large fruit of course necessitating the use of larger tubes than small fruit; but for general use the tubes are of a size to freely allow the passage of apples and like fruit through the same. Each section is preferably of cylindrical form, and the outer section, which is also the lowest section, is provided with a longitudinal rectangular extension 22, forming a longitudinal inner groove 23, in which sheave-brackets 24 are free to travel, said brackets being affixed to opposite ends of the intermediate section and each having a cord-sheave 25, adapted to revolve on a pin 26, extending through the bracket and arranged axially with reference to the staff. The intermediate section is provided with a longitudinal opening or slot 27, extending from bracket to bracket, and on the inner end of the inner or uppermost section is an eye 28, which extends through said slot and is guided therein on movement of the inner section within the intermediate section. Near the upper end of the outer or lower section is an opening 29, covered by a bracket 30, having a cord-sheave 31 therein, which is revoluble on a pin 32, extending through said bracket at a right angle to the pins 26, on which the cord-sheaves of the intermediate section revolve.

Secured to a shaft 33, revolubly mounted on the outer or lower section in any suitable manner, is an adjusting-reel 34, provided with a notched flange 35, adapted to be engaged by a spring or spring-controlled pawl 36, serving to hold the reel against revolving. An adjusting-cord 37 has one of its ends secured to said reel and its other end attached to the eye 28 at the inner end of the inner section. From the latter point the cord is directed upward around the sheave at the upper end of the intermediate section, then down to and around the sheave at the lower end of said intermediate section, thence around the sheave at the upper end of the outer section, and finally to and around the cord-adjusting reel 34, to which one end is attached, as stated. Thus it is apparent that on revolving the reel 34 in one direction after releasing the pawl 36 the intermediate section is drawn out of the outer section with the inner section therein until the sheave at the lower end of the intermediate section is brought in rear of the sheave on the outer section, after which the cord continues to travel over the several sheaves to draw the inner or uppermost section out of the projected intermediate section to the desired extent. Obviously the extension may be confined to the intermediate section without causing the withdrawal of the inner section, and whatever the extent of extension the parts are locked in position by the pawl 36 engaging the notched flange of the reel.

A rotary cutter 38 is affixed to the outer end of the inner section and comprises an inner member 39 and an outer member 40. The inner member of the cutter is fixed to said inner section and comprises a cylindrical securing portion 41, fitting onto the end of the inner section and being secured thereto by a rivet 42, and an enlarged shearing portion 43, having a circular series of V-shaped notches 44. The movable member surrounds said shearing portion of the fixed member and is provided with a corresponding series of V-shaped notches 45, normally held to register with the notches in the fixed member. An annular space 46 is provided between both members of the cutter, in which a helical spring 47 is located, having one end thereof secured to the fixed member and its other end secured to the movable member, serving at all times to hold said movable member in its normal position, so that the notches in both members register. The outer member of the cutter is provided with a slot 48, through which an eye 49 projects, which is secured to the inner member of the cutter. A bell-crank lever 50 is pivotally connected to the outer member of the cutter and has one arm thereof extending through said eye. To the other arm of said bell-crank lever one end of an operating-cord 51 is secured, which cord extends along the telescopic sections and has its other end secured to an operating-reel 52, yieldingly secured to the shaft 33, on which the reel 34 is secured. The reel 52 is hollow and has its ends 53 loosely fitting the shaft, with a spiral spring 54 surrounding the shaft and having one end thereof secured to the same and its other end secured to one end of the reel. The operating-cord 51 is wound around the reel 52 in a direction opposite that in which the adjusting-cord is wound around the reel 34, and therefore when one cord is being wound up the other cord is being paid out. The spring 54, by reason of its tendency to unwind, holds the operating-cord 51 taut at all times, and as this spring is of less power than the helical spring 47 in the cutter the bell-crank lever is not in the least affected thereby.

On operating the device the cutter is directed to the fruit, which is confined therein with the stem thereof lying in two registering notches, and on a slight pull of the operating-cord the outer member of the cutter is revolved and severs the fruit from the tree, which then drops through the hollow staff and into a fruit bag or receptacle 55, fastened to the lower end of the staff. The fruit-bag is preferably made of drilling or other suitable fabric or material and consists of a body portion 56, open at the top, as at 57, and having a shoulder-strap 58 for convenience in carrying the same and a sleeve extension or neck 59 opening into the body portion at one side thereof and a distance above the lower end of the same. Said sleeve extension has secured to its outer end a thimble 60, having a rectangular longitudinal extension 61, corresponding with the longitudinal extension on the outer section of the staff, thus forming a thimble adapted to fit over the lower end of the staff. This thimble is provided with a spring-catch 62, having an inwardly-projecting pin 63 extending into an opening in the outer section of the staff, by means of which the fruit-bag is held against accidental detachment from the staff. The sleeve extension of the fruit-bag is of sufficient length to hang in a loose condition to provide a curved portion 64, into which the fruit drops as it passes through the staff, thereby preventing its becoming bruised by violent contact with the fruit in the bag. After the fruit has lodged in the curved portion 64 of the sleeve extension it may be deposited in the bag proper by raising the said curved portion sufficiently to permit the fruit to roll into the bag.

Having thus described my invention, what I claim is—

1. In a fruit-picker, the combination of a hollow telescopic staff, a cutter at the upper end of said staff, means for extending and telescoping said staff, means within reach of the operator for actuating said cutter, and a fruit-receptacle affixed to the lower end of the staff for the reception of the fruit passing through said staff.

2. In a fruit-picker, the combination of a hollow staff comprising telescoping sections, the outer section having a sheave at its upper end, a reel secured to the lower end of the outer section, a cord passing over said sheave and having one end thereof secured to said reel and its other end to the lower end of the inner section, and a cutter secured to the upper end of the inner section.

3. In a fruit-picker, the combination of a hollow telescopic staff comprising an outer section, an inner section and an intermediate section, the outer section having a sheave at its upper end, and the intermediate section having a sheave at each end, a reel secured to the lower end of the outer section, a cord having one end thereof secured to said reel, and passing from thence over the sheave at the upper end of the outer section, thence around the sheaves at the ends of the intermediate section, and having its other end secured to the lower end of the inner section, a cutter at the upper end of the inner section, and means for operating said cutter.

4. In a fruit-picker, the combination of a hollow telescopic staff comprising an outer section, an inner section, and an intermediate section, the intermediate section having a sheave at each end revoluble on axially-arranged pins, and the outer section having a sheave at its upper end revoluble on a pin arranged at a right angle to the first-mentioned pins, a reel secured to the lower end of the outer section, a cord passing over the sheaves above mentioned and having one end secured to said reel and its other end secured to the lower end of the inner section, a cutter at the upper end of the inner section, and means for operating said cutter.

5. In a fruit-picker, the combination of a hollow telescopic staff comprising an outer section having a sheave at its upper end and a longitudinal rectangular extension forming a groove therein, an intermediate section having a sheave at each end and a longitudinal slot extending from sheave to sheave, and an inner section having an eye at its lower end extending through said slot, a cord passing over the sheaves on the outer and intermediate sections and having one end thereof secured to said eye, a reel affixed to the outer section to which the other end of said cord is secured, a cutter at the upper end of the inner section, and means for actuating said cutter.

6. In a fruit-picker, the combination of a hollow staff, a cutter secured to said staff and comprising a cylindrical fixed member and a movable member surrounding said fixed member, said members having registering V-shaped notches in their edges, a convolute spring between said members having one end secured to the fixed member and its other end secured to the movable member, said spring serving to hold the notches in registration, and means for actuating the movable member.

7. In a fruit-picker, the combination of a hollow staff, a cutter secured to said staff and comprising a cylindrical fixed member and a movable member surrounding said fixed member, said members having registering V-shaped notches in their edges, and the movable member having a slot formed therein, an eye secured to the fixed member and extending through said slot, a bell-crank lever pivoted to the movable member and having one arm thereof extending through said eye, an operating-cord affixed to the other arm of said bell-crank lever, and a spring between the movable and fixed members of the cutter, said spring having one end thereof secured to the fixed member and its other end secured to the movable member and serving to hold the notches in said members in registration.

8. In a fruit-picker, the combination of a hollow telescopic staff, a cutter comprising a fixed member secured to the upper end of said staff and a movable member surrounding said fixed member and having a slot therein, said members having registering V-shaped notches in their edges, an eye secured to the fixed member and extending through said slot, a bell-crank lever pivoted to the movable member and having one arm thereof extending through said eye, a spring between the members of the cutter having one end thereof secured to the fixed member and its other end secured to the movable member, an operating-cord having one end thereof secured to the free end of the bell-crank lever, and a reel affixed to the lower end of the staff and having the other end of said operating-cord attached thereto.

9. In a fruit-picker, the combination of a telescopic staff, a cutter at the upper end of said staff, a reel at the lower end of the staff, and an operating-cord having one end attached to the cutter and its other end attached to said reel.

10. In a fruit-picker, the combination of a telescopic staff, a cutter at the upper end of said staff, a reel at the lower end of said staff, an operating-cord having one end attached to said cutter and its other end attached to the reel, and means for holding said operating-cord taut.

11. In a fruit-picker, the combination of a telescopic staff, a cutter at the upper end of said staff, a shaft journaled on the lower end of said staff, a hollow reel held loosely on said shaft, a spiral spring surrounding said shaft and having one end thereof affixed thereto and its other end affixed to the reel, an operating-cord having its ends secured to said reel and the cutter, respectively, and means for extending and telescoping the staff.

12. In a fruit-picker, the combination of a telescopic staff, a cutter at the upper end of said staff, a shaft journaled on the lower end of the staff, a reel secured to said shaft, an adjusting-cord having one end thereof secured to said reel and its other end secured to the inner member of the staff to project the same, a second reel loosely mounted on said shaft, a spiral spring surrounding said shaft and having one end thereof affixed thereto and its other end affixed to the second reel, and an operating-cord having its ends secured to said second reel and the cutter, respectively.

13. In a fruit-picker, the combination of a hollow telescopic staff comprising an outer member having a sheave at its upper end and an inner member, a cutter at the upper end of the inner member, an operating-cord having one end thereof attached to the cutter, an adjusting-cord passing over the sheave on the outer member and having one end thereof secured to the lower end of the inner member, and a reel around which said cords are wound, said cords being so arranged on the reel that one cord is paid out while the other is wound up.

14. In a fruit-picker, the combination of a hollow staff, a cutter at the upper end of said staff arranged to deliver the fruit through said staff, and a fruit-receptacle comprising a body portion having a shoulder-strap and a sleeve extension opening into the side of said body portion a distance above the bottom thereof, said sleeve extension having a thimble at its free end adapted to fit the lower end of the hollow staff.

In testimony whereof I have affixed my signature in the presence of two subscribing witnesses.

CHARLES LARDNER.

Witnesses:
 EMIL NEUHART,
 MAY SEWERT.